(12) United States Patent
Tsuji

(10) Patent No.: US 7,043,519 B2
(45) Date of Patent: May 9, 2006

(54) SIMD SUM OF PRODUCT ARITHMETIC METHOD AND CIRCUIT, AND SEMICONDUCTOR INTEGRATED CIRCUIT DEVICE EQUIPPED WITH THE SIMD SUM OF PRODUCT ARITHMETIC CIRCUIT

(75) Inventor: Masayuki Tsuji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 439 days.

(21) Appl. No.: 09/945,697

(22) Filed: Sep. 5, 2001

(65) Prior Publication Data

US 2002/0138535 A1    Sep. 26, 2002

(30) Foreign Application Priority Data

Jan. 31, 2001    (JP)    ................................ 2001-24153

(51) Int. Cl.
*G06F 7/00*    (2006.01)
*G06F 7/38*    (2006.01)
(52) U.S. Cl. ...................... 708/603; 708/523
(58) Field of Classification Search ............... 708/603, 708/523, 524; 712/220, 221
See application file for complete search history.

(56) References Cited

U.S. PATENT DOCUMENTS

| | | | | |
|---|---|---|---|---|
| 5,179,531 A | * | 1/1993 | Yamaki | ...................... 708/490 |
| 5,442,580 A | * | 8/1995 | Fettweis | ...................... 708/524 |
| 5,475,856 A | | 12/1995 | Kogge | |
| 5,596,518 A | | 1/1997 | Toyokura et al. | |
| 5,801,975 A | * | 9/1998 | Thayer et al. | ............... 708/402 |
| 5,941,940 A | * | 8/1999 | Prasad et al. | ............... 708/523 |
| 6,029,267 A | * | 2/2000 | Simanapalli et al. | ........ 714/795 |
| 6,526,430 B1 | * | 2/2003 | Hung et al. | ................. 708/523 |
| 6,711,602 B1 | * | 3/2004 | Bhandal et al. | ............. 708/625 |

FOREIGN PATENT DOCUMENTS

| | | |
|---|---|---|
| EP | 0 466 997 A1 | 1/1992 |
| EP | 0 660 245 A2 | 6/1995 |

OTHER PUBLICATIONS

European Search Report dated Jan. 26, 2005.

* cited by examiner

*Primary Examiner*—Tan V. Mai
(74) *Attorney, Agent, or Firm*—Staas & Halsey LLP

(57) ABSTRACT

In an SIMD sum of product arithmetic method of enabling a concurrent execution of 2n (where n is a natural number) parallel sum of product arithmetic (operations), the SIMD sum of product arithmetic is executed using $2^m$ (m=0, ..., $\log_2 n$) accumulators as one set, and by replacing a 2p-1th accumulator with an adjacent 2pth (p=1, ..., n/2) accumulator, without changing a sequence of accumulator addresses, in the set, as accumulator addresses to be allocated to sum of product arithmetic circuits for the SIMD sum of product arithmetic.

16 Claims, 10 Drawing Sheets

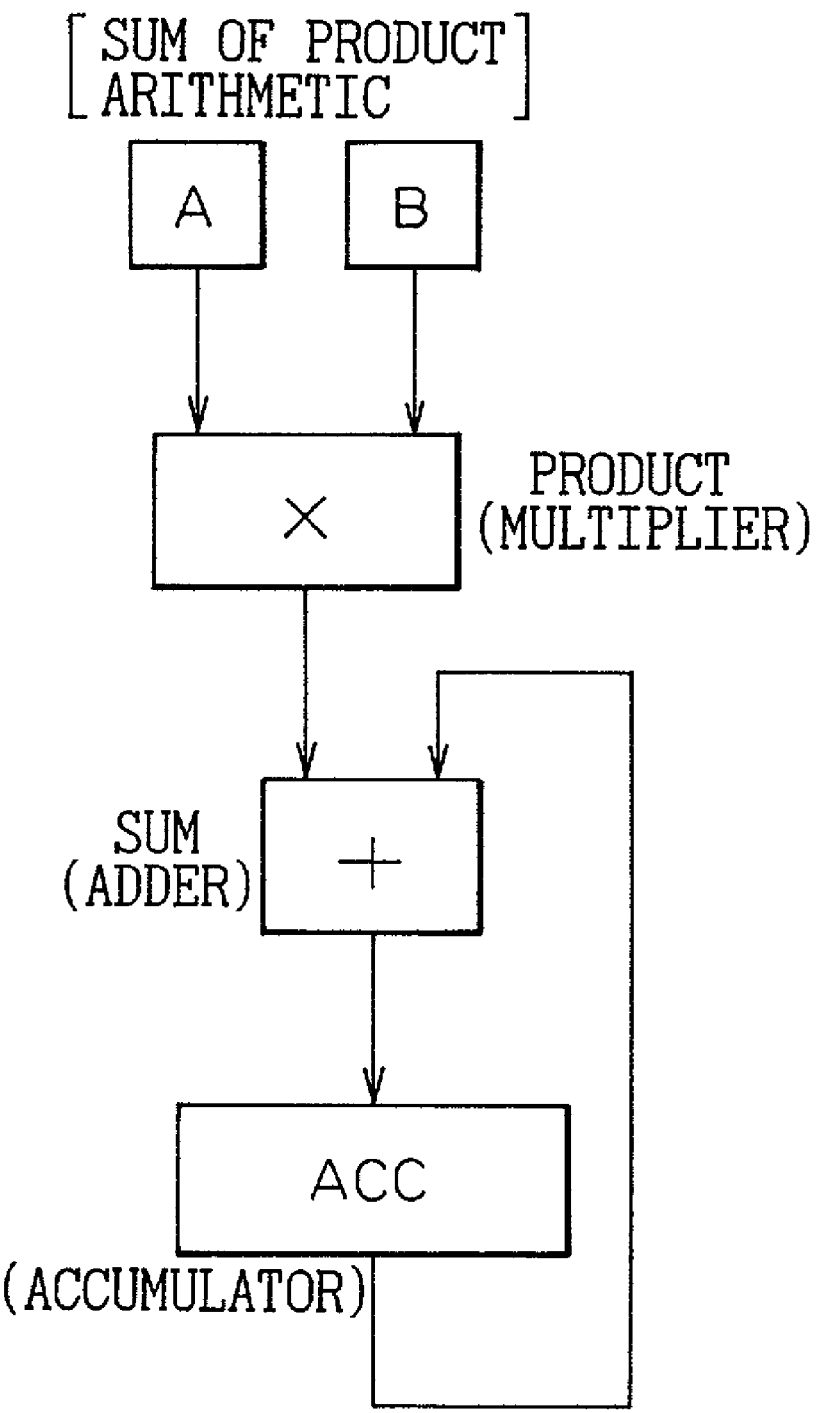

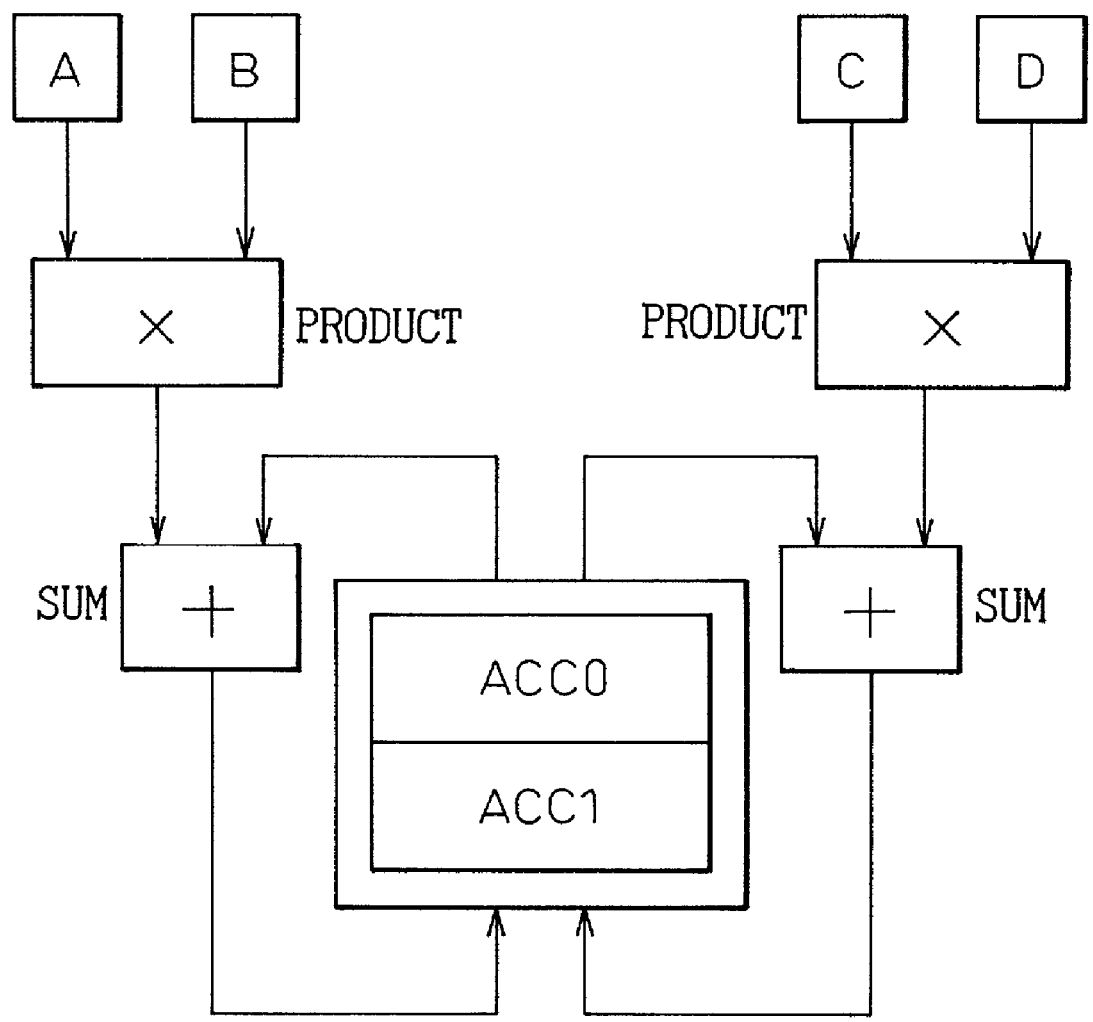

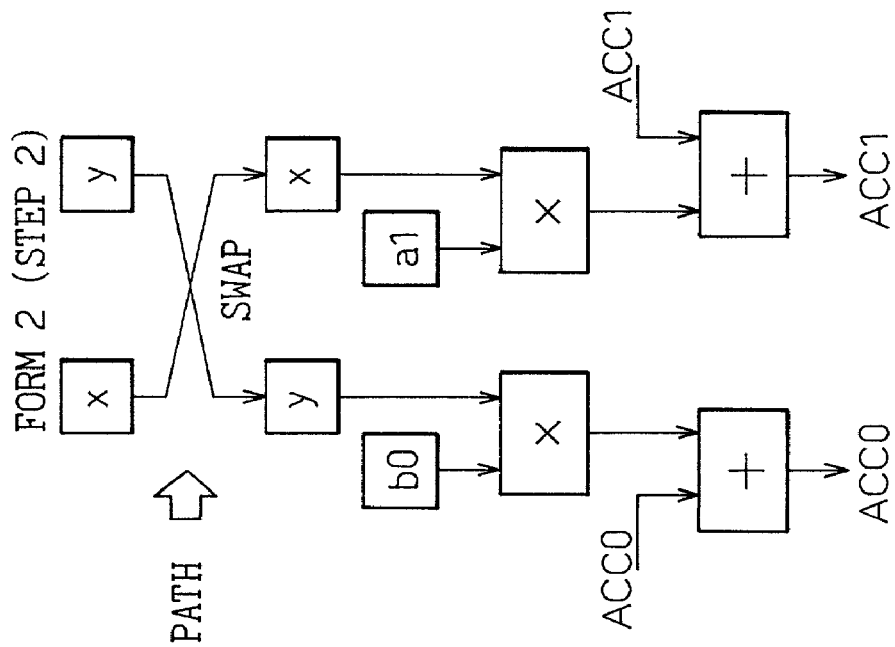
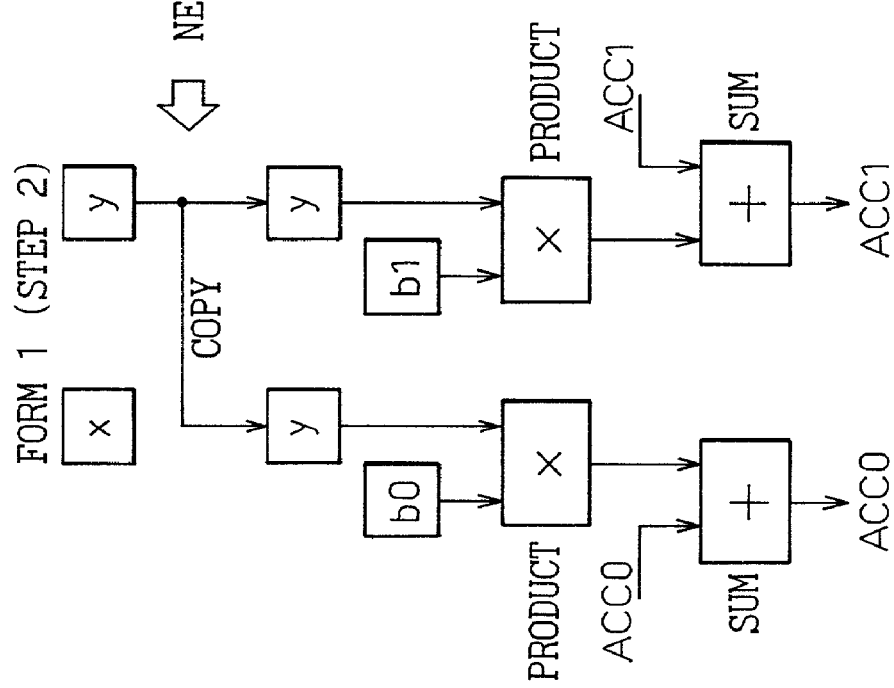

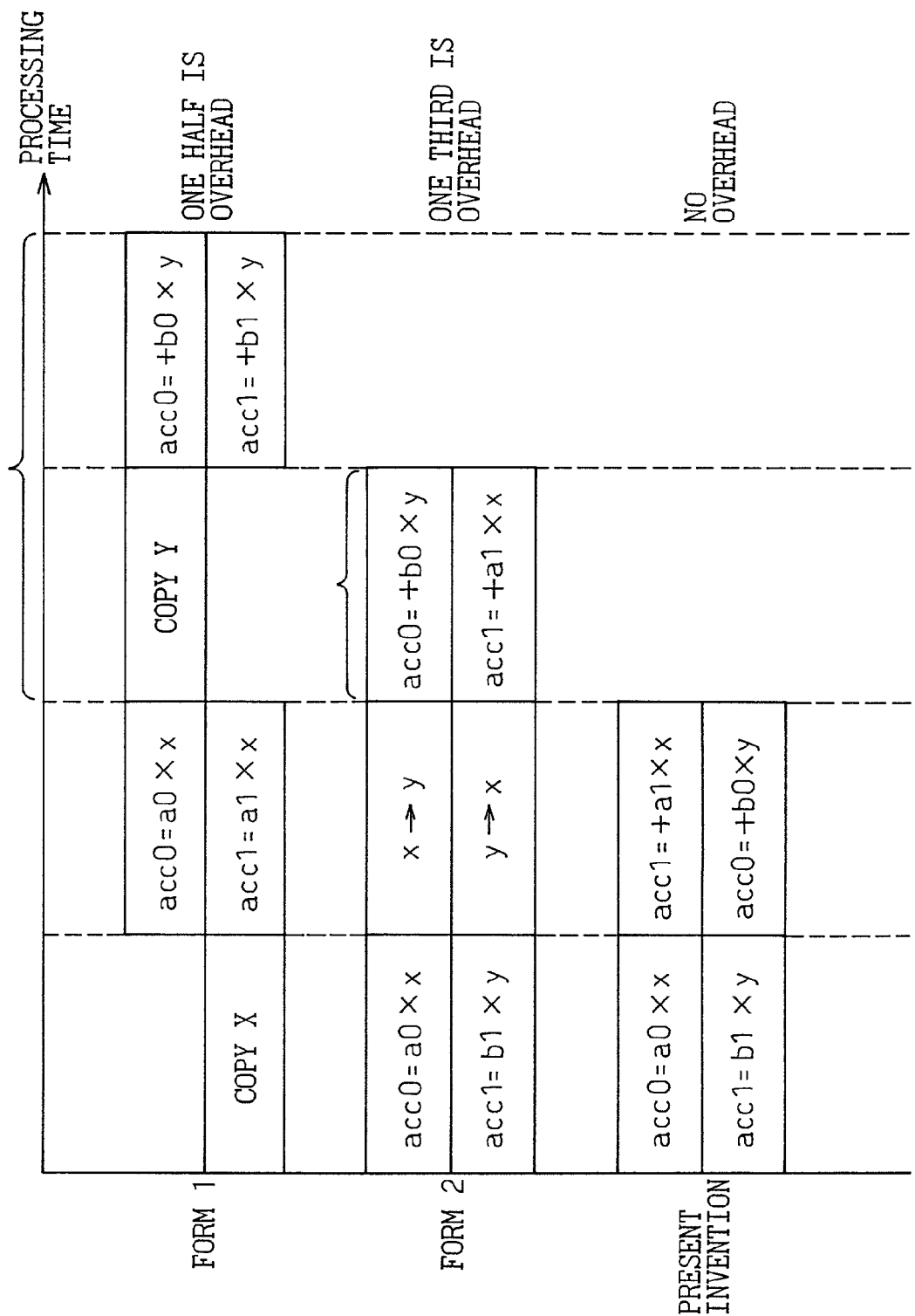

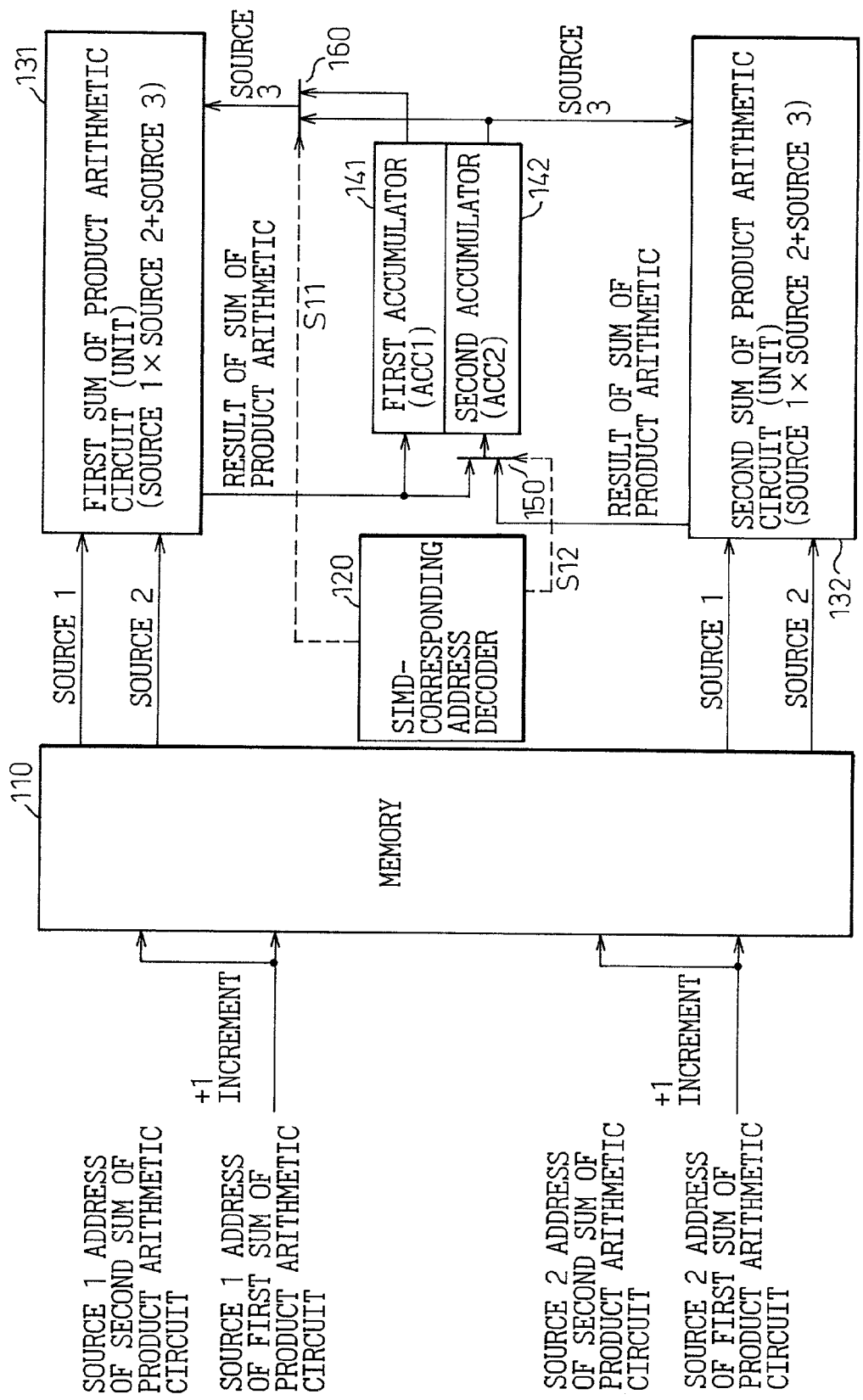

SIMD SUM OF PRODUCT ARITHMETIC METHOD AND CIRCUIT, AND SEMICONDUCTOR INTEGRATED CIRCUIT DEVICE EQUIPPED WITH THE SIMD SUM OF PRODUCT ARITHMETIC CIRCUIT

BACKGROUND OF THE INVENTION

1. Field of the Invention

The present invention relates to a sum of product arithmetic technique, and more particularly, to an SIMD sum of product arithmetic method, an SIMD sum of product arithmetic circuit, and a semiconductor integrated circuit device equipped with the SIMD sum of product arithmetic circuit.

2. Description of the Related Art

In recent years, attention has been paid to SIMD (Single Instruction Stream-Multiple Data Stream) arithmetic for concurrently processing (computing) a plurality of data with one instruction. In order to realize a high-functional and high-performance system for carrying out (executing) high-speed data processing and image processing, as in a color laser printer or a navigation system, for example, it is necessary to use a powerful processor having an SIMD arithmetic function.

The SIMD technique is a control system for concurrently processing a plurality of data with one instruction, and SIMD matrix arithmetic (processing) is an SIMD (sum of product) arithmetic technique capable of executing matrix arithmetic at high speed. In the sum of product arithmetic circuit for carrying out such SIMD matrix arithmetic, a new path (process) for copying or swapping the arguments of a matrix arithmetic is necessary, and this has lowered the processing performance. Therefore, there has been a strong demand for the provision of a sum of product arithmetic circuit capable of executing an SIMD arithmetic at high speed.

The prior art and the problems associated with the prior art will be described in detail, later, with reference to accompanying drawings.

SUMMARY OF THE INVENTION

An object of the present invention is to provide a sum of product arithmetic technique capable of executing SIMD arithmetic for carrying out a high-speed matrix arithmetic without decreasing a maximum operation frequency, without increasing latency, and without substantially changing a circuit.

According to the present invention, there is provided a sum of product arithmetic method of enabling a concurrent execution of 2n (where n is a natural number) parallel sum of product arithmetic (operations), wherein the sum of product arithmetic is executed using $2^m$ (m=0, . . . , $\log_2$ n) accumulators as one set, and by replacing a 2p−1th accumulator with an adjacent 2pth (p=1, . . . , n) accumulator, without changing sequence of accumulator addresses in the set as accumulator addresses to be allocated to sum of product arithmetic circuits for the sum of product arithmetic.

Further, according to the present invention, there is provided a sum of product arithmetic method of enabling an SISD sum of product arithmetic circuit having 2n (where n is a natural number) sum of product execution units that are operated concurrently, to execute sum of product arithmetic, wherein the sum of product execution units are used for sum of product arithmetic; and the sum of product arithmetic is executed using $2^m$ (m=0, . . . , $\log_2$ n) accumulators as one set, and by replacing a 2p−1th accumulator with an adjacent 2pth (p=1, . . . , n/2) accumulator, without changing sequence of accumulator addresses in the set as accumulator addresses to be allocated to sum of product execution units for the sum of product arithmetic.

The sum of product arithmetic may be executed by replacing the accumulator addresses. The sum of product arithmetic may be an SIMD sum of product arithmetic.

According to the present invention, there is provided a sum of product arithmetic method of enabling a concurrent execution of 2n (where n is a natural number) parallel sum of product arithmetic (operations), wherein the sum of product arithmetic is executed using $2^m$ (m=0, . . . , $\log_2$ n) accumulators as one set, and by replacing a 2p−1th accumulator with an adjacent 2pth (p=1, . . . ,) accumulator, without changing sequence of accumulator addresses in the set as accumulator addresses to be allocated to sum of product arithmetic circuits for the sum of Further, according to the present invention, there is also provided a semiconductor integrated circuit device having a semiconductor chip on which a sum of product arithmetic circuit is formed, the sum of product arithmetic circuit comprising 2n (where n is a natural number) sum of product execution units that are operated concurrently, each sum of product execution unit being equipped with a multiplier, an adder and an accumulator, wherein the sum of product arithmetic circuit executes sum of product arithmetic using $2^m$ (m=0, . . . , $\log_2$ n) accumulators as one set, and by replacing a 2p−1th accumulator with an adjacent 2pth (p=1, . . . , n) accumulator, without changing sequence of accumulator addresses in the set as accumulator addresses to be allocated to sum of product execution units for the sum of product arithmetic.

The sum of product arithmetic circuit may further comprise first selectors, each provided for each sum of product execution unit, for supplying data of each accumulator by switching data of the accumulator; and second selectors, each provided for each accumulator, for switching a processing result of each sum of product execution unit, and storing the switched processing result, and wherein the sum of product arithmetic circuit may control the first and second selectors to make the sum of product execution units execute a predetermined sum of product arithmetic. Each of the first and second selectors may be switch controlled based on a control signal output from an address decoder to which a swap instruction signal is supplied.

The sum of product arithmetic circuit may further comprise third selectors, for switching source data addresses between addresses for an SISD sum of product arithmetic and addresses for the sum of product arithmetic, and for inputting the source data addresses to a memory from which source data is to be supplied to the 2n sum of product execution units. Each of the first, second and third selectors may be switch controlled based on a valid signal for selecting one sum of product execution unit as a valid unit.

The sum of product arithmetic circuit may further comprise fourth selectors, for switching resources to be supplied to an instruction decoder for generating a control signal necessary for controlling the 2n sum of product execution units, between resources for an SISD sum of product arithmetic and resources for the sum of product arithmetic, and using the selected resources. The sum of product arithmetic may be an SIMD sum of product arithmetic.

BRIEF DESCRIPTION OF THE DRAWINGS

The present invention will be more clearly understood from the description of the preferred embodiments as set forth below with reference to the accompanying drawings, wherein:

FIG. 1 is a diagram showing one example of a process of a general SISD sum of product arithmetic;

FIG. 2 is a diagram showing one example of a process of a parallel SISD sum of product arithmetic;

FIG. 3A and FIG. 3B are diagrams for explaining problems of a conventional sum of product arithmetic;

FIG. 4 is a time chart showing a matrix arithmetic according to the present invention as compared with a conventional matrix arithmetic;

FIG. 5 is a block diagram showing one example of an SIMD sum of product arithmetic circuit relating to a conventional technique;

DETAILED DESCRIPTION OF THE REFERRED EMBODIMENTS

Figure 6:
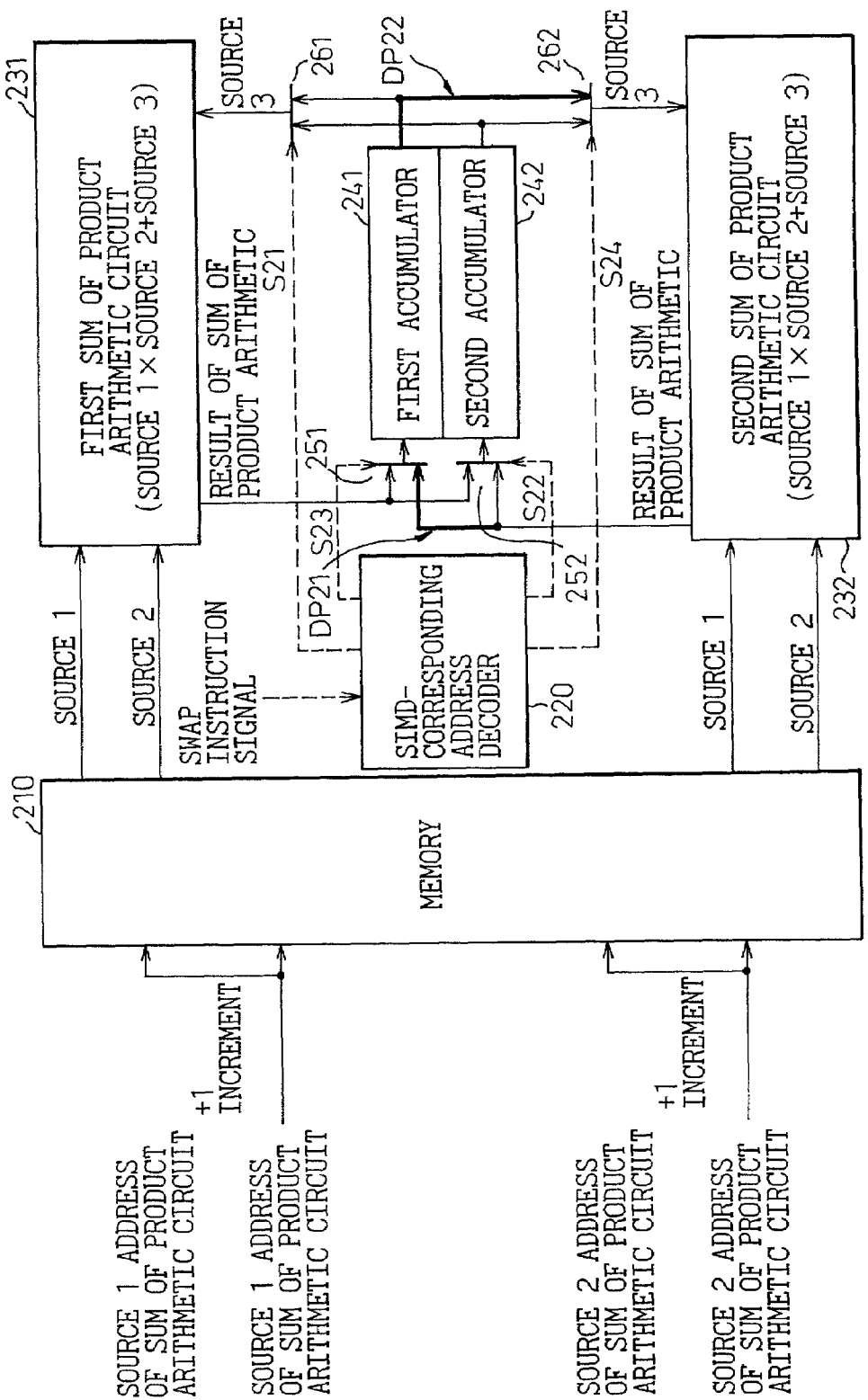
FIG. 6 is a block diagram showing an SIMD sum of product arithmetic circuit according to one embodiment of the present invention.

Before describing embodiments of the present invention in detail, conventional sum of product arithmetic circuits and their problems will be explained with reference to the drawings.

Conventionally, a matrix arithmetic of two rows and two columns has been expressed as shown in the following expression f1. The matrix arithmetic is carried out in the manner as described later. It is possible to classify the matrix arithmetic into two forms of form 1 and form 2, depending on the sequence of processing of product and sum.

$$\begin{pmatrix} X \\ Y \end{pmatrix} = \begin{bmatrix} a0, & b0 \\ a1, & b1 \end{bmatrix} \begin{pmatrix} x \\ y \end{pmatrix} \quad \text{f1}$$

$$= \begin{pmatrix} a0 \times x + b0 \times y \\ a1 \times x + b1 \times y \end{pmatrix} \quad \text{(form 1)}$$

$$= \begin{pmatrix} a0 \times x + b0 \times y \\ b1 \times y + a1 \times x \end{pmatrix} \quad \text{(form 2)}$$

Consider the case of carrying out the above matrix arithmetic based on an SIMD instruction for executing two operations in parallel using two sum of product processors capable of concurrently executing the matrix arithmetic.

A general two parallel SIMD sum of product arithmetic instruction of three-operand form is defined as follows.

mnemonic (example) dmac RSi,RSj,ACCk arithmetic (processing) to be carried out:

$ACCk = RSi \; XRSj + ACCk$ $ACCk+1 = RSi+1 \; XRSj+1 + ACCk+1$

It is assumed that the left-hand side (X, Y) of the expression 1 as a result of the matrix arithmetic is stored in two accumulators ACC0 and ACC1 respectively.

A status of the processing according to the form 1 is shown in the following expression f2.

step 1

$acc0 = a0Xx$ $acc1 = a1Xx$ step 2

$acc0 = b0Xy + acc0$ $acc1 = b1Xy + acc1$      f2

First, at step 1, x is prepared by two ((RSj, RSj+1)=(x, x)). These are multiplied with coefficients (a0, a1) (=(RSi, RSi+1)) in the first column of the matrix respectively. Results of the multiplication are stored in the accumulators (acc0, acc1) (=(ACCk, ACCk+1)) respectively. In this case, when both accumulators acc0 and acc1 are zero, the multiplication results and the values of the accumulators are added respectively, and the sums may be stored in the accumulators respectively (sum of product arithmetic).

Next, at step 2, y is prepared by two ((RSj, RSj+1)=(y, y)). These are multiplied with coefficients (b0, b1) (=(RSi, RSi+1)) in the second column of the matrix respectively. The products are added to the values of the accumulators (acc0, acc1) (=(ACCk, ACCk+1)) respectively. The results are stored in the accumulators (acc0, acc1) respectively (sum of product arithmetic).

A status of the processing according to the form 2 is shown in the following expression f3.

step 1

$acc0 = a0Xx$ $acc1 = b1Xy$ step 2

$acc0 = b0Xy + acc0$ $acc1 = a1Xx + acc1$      f3

First, at step 1, (x, y) are multiplied with the coefficients (a0, b1) to obtain inner products, and the results are stored in the accumulators (acc0, acc1) respectively. In this case, when both accumulators (acc0, acc1) are zero, the multiplication results and the values of the accumulators are added respectively, and the results may be stored in the accumulators (acc0, acc1) respectively (sum of product arithmetic).

Next, at step 2, (x, y) is replaced with (y, x). Then, (y, x) are multiplied with the coefficients (b0, a1) to obtain inner products. The inner products are added to the values of the accumulators (acc0, acc1) respectively. The results are stored in the accumulators (acc0, acc1) respectively (sum of product arithmetic).

According to the conventional technique, it has been necessary to copy or rearrange the arguments (x, y) in order to execute the matrix arithmetic of the above expression f1.

FIG. 1 is a diagram showing one example of a process of a general SISD (Single Instruction Stream-Single Data Stream) sum of product arithmetic. FIG. 2 is a diagram showing one example of a process of a parallel SISD sum of product arithmetic. FIG. 3A and FIG. 3B are diagrams for explaining problems of a conventional sum of product arithmetic. In FIG. 2, the selection of accumulators ACC0 and ACC1 has been determined in advance by a sum of product arithmetic instruction to be executed.

The sum of product arithmetic is calculated in the process shown in FIG. 1. The matrix arithmetic of two rows and two columns is carried out in the process as shown in FIG. 3A and FIG. 3B. In other words, as shown in FIG. 3A, at step 2 of the form 1, the argument y is copied. Then, the same two arguments (y, y) are multiplied with the coefficients (b0, b1) respectively. As shown in FIG. 3B, at step 2 of the form 2, the arguments (x, y) of step 1 are swapped with (y, x). Then, the arguments (y, x) are multiplied with the coefficients (b0, a1) respectively. Therefore, according to the form 1 shown in FIG. 3A, a new process (path) for copying the argument is necessary. Also, according to the form 2 shown in FIG. 3B, a new path for swapping the arguments is necessary. These new processes become overhead on the matrix arithmetic.

The execution of the matrix arithmetic by providing a process for copying or swapping the overhead requires time (a step) for executing a certain instruction for realizing this process. This leads to a increase in the latency of the matrix arithmetic, and results in a reduction in the total processing performance of a sum of product arithmetic circuit (semiconductor integrated circuit device: processor).

For physically processing the overhead, the new paths shown in FIG. 3A and FIG. 3B are necessary. This results in an increase in the physical volume (hardware) as an increase in the number of logic steps of the data path or wiring. It also becomes necessary to provide decoding means (a decoder and a control signal) for selecting the new paths. There is also an increase in the number of logic steps for generating a control signal necessary for starting the execution of the instruction. Consequently, this results in a reduction in the maximum operation frequency of the sum of product arithmetic circuit.

FIG. 4 is a time chart showing a matrix arithmetic according to the present invention as compared with a conventional matrix arithmetic.

As shown in FIG. 4, in the case of executing a matrix arithmetic of two rows and two columns, the provision of the process for copying or swapping requires the time for executing a certain instruction to realize this process. As a result, in the case of the above form 1 (the conventional matrix arithmetic), one half of the processing becomes the overhead. Further, in the case of the above form 2, one third of the processing becomes the overhead. On the other hand, according to the present invention, there exists no such overhead, and it becomes possible to maintain the total processing performance, without increasing the latency of the matrix arithmetic.

According to the present invention, first, as next SIMD instruction is defined that reverses the accumulators to be used, as compared with the case of the general SIMD arithmetic.

mnemonic (example) dmacx RSi,RSj,ACCk
arithmetic to be carried out:

$ACCk+1=RSi\ XRSj+ACCk+1$ $ACCk=RSi+1\ XRSj+1\ +ACCk$

Based on this, the swapping of (x, y) that has been necessary in the above form 2 becomes unnecessary.

Specifically, first, at step 1, (x, y) are multiplied with coefficients (a0, b1) to obtain inner products. The inner products are stored in accumulators (acc0, acc1). In this case, when both accumulators acc0 and acc1 are zero, the multiplication results and the values of the accumulators are added respectively, and the sums may be stored in the accumulators respectively (sum of product arithmetic).

Next, at step 2, (x, y) are multiplied with coefficients (a1, b0) to obtain inner products. The inner products are added to the values of the accumulators (acc0, acc1) respectively, and the results are stored in the accumulators respectively (sum of product arithmetic).

Based on the above, the swapping of the arguments (x, y) that has been necessary in the above form 2 becomes unnecessary, and the new path as shown in FIG. 3B is not necessary. As a result, it becomes possible to execute the matrix arithmetic without overhead, as shown in FIG. 4.

The effects generated from the swapping of the accumulators according to the present invention are small or negligible, and cause no practical problem, as shown below.

As described above, the two sum of product arithmetic circuits (the sum of product execution units) capable of carrying out a parallel processing are structured as shown in FIG. 2.

First, the instruction decoding necessary for swapping accumulator addresses will be explained. In sum of product arithmetic, the addition of the values stored in the accumulators is carried out after the multiplication is started, and sufficient time is given to the instruction decoding for swapping the accumulator addresses. Therefore, effects generated due to the swapping of the accumulators can be disregarded.

The data path will be explained next. When it is possible to access both accumulators from the two sum of product processors, it is possible to execute the present invention by only controlling the accumulator addresses, as the data path necessary for executing the present invention has been prepared in advance. Therefore, effects generated due to the data path can also be disregarded.

As is clear from the comparison between FIG. 5 and FIG. 6, to be described later, when a first sum of product processor (131; 231) can access both accumulators (141, 142; 241, 242), and also when a second sum of product processor (132; 232) can access a second accumulator (142; 242), (in other words, when the second sum of product processor (132; 232) is a sum of product processor exclusively for the SIMD instruction), the application of the present invention requires provision of a new path from the second sum of product processor (232) to the first accumulator (241). However, the number of logic steps of the second sum of product processor (232) is the same as the number of logic steps of the first sum of product processor (231). Therefore, effects of the provision of the new path are negligible.

When the sum of product processors and the accumulators are in a one-to-one relationship, it is necessary to provide a new path from one sum of product processor to the other accumulator, and this leads to an increase in the number of logic steps for one selector. However, in this case, there is also sufficient time for generating a selector control signal, and it is possible to structure an applicable data path circuit (a high-speed data path) easily. Therefore, effects of the provision of the new path are negligible.

While the above explains the two parallel SIMD instructions, it is also possible to expand the logic to 2n parallel SIMD instructions.

Consider one set of $2^m$ (m=0, - - - , $\log_2 n$) ACCs (accumulators) in a 2n matrix. The operation of replacing adjacent ACCs of (2p−1)-th ACC with 2p-th (p=1, - - - , n) ACC without changing the sequence of the ACCs in this set (that is, the swapping operation) is defined as fm_1( ). The operation of not carrying out the swapping is defined as fm_0( ).

Therefore, in the two parallel processing, the following relationship exists.

$$dmac=f0\_0(dmac), dmacx=f0\_1(dmac)$$

SIMD instructions of parallel degree 2n are generally expressed as follows.

mnemonic (example) nmac RSi,RSj,ACCk
processing to be carried out:

$$ACCk=RSi\ XRSj+ACCk$$

$$ACCk+1\ RSi+1=XRSj+1+ACCk+1:$$

$$ACCk+n-1=RSi+n-1\ XRSj+n-1+ACCk+n-1$$

Therefore, the SIMD instruction of the present invention is expressed as follows when the following [A]n is defined as the recurrent repetition of the operation A by n times.

$$[fm_13 1(mac)p(m=\log_2 n-p;\ p=1,---,\log_2 n)$$

When the above is used, it becomes possible to carry out a matrix arithmetic without overhead from the viewpoint of hardware structure and from the viewpoint of execution performance.

The present invention is for swapping the ACCS, and the corresponding SIMD sum of product arithmetic is not selected. For example, it is possible to apply the invention to the following SIMD sum of product arithmetic instruction. Consider four-parallel SIMD sum of product arithmetic instructions (nmacx) equipped with two sum of product processors of the form 2.

mnemonic (example) nmacx RSi,RSj,ACCk
arithmetic to be carried out:

$$ACCk=RSi\ XRSj+1+ACCk$$

$$ACCk+1=RSi+1\ XRSj+ACCk+1$$

$$ACCk+2=RSi+2\ XRSj+3+ACCk+n-1$$

$$ACCk+3=RSi+3\ XRSj+2+ACCk+n-1$$

In this case, it is possible to define the following instruction having the structure of f_1(nmacx).
arithmetic to be carried out:

$$ACCk+1=RSi\ XRSj+1+ACCk+1$$

$$ACCk=RSi+1\ XRSj+ACCk$$

$$ACCk+3=RSi+2\ XRSj+3+ACCk+3$$

$$ACCk+2=RSi+3\ XRSj+2+ACCk+2$$

Therefore, based on the execution of nmac, nmacx, f1_1 (nmac), and f1_1(nmacx), it is possible to carry out a matrix arithmetic of four rows and four columns without overhead.

While the three-operand form has been explained as an example in the above, it is possible to apply the present invention to any operand system in a hardware structure that has a plurality of accumulators.

Embodiments of a sum of product arithmetic circuit for carrying out the SIMD arithmetic relating to the present invention and a semiconductor integrated circuit device equipped with this sum of product arithmetic circuit will be explained below in comparison with a conventional technique and a relevant technique, with reference to the attached drawings.

FIG. 5 is a block diagram showing one example of an SIMD sum of product arithmetic circuit relating to a conventional technique. In FIG. 5, a reference number 110 denotes a memory, 120 denotes an address decoder (an SIMD-corresponding address decoder), 131 and 132 denote sum of product arithmetic circuits (sum of product execution units), 141 and 142 denote accumulators, and 150 and 160 denote selectors.

The first sum of product arithmetic circuit (the first sum of product execution unit) 131 can carry out both SISD sum of product arithmetic and SIMD sum of product arithmetic. The second sum of product arithmetic circuit (the second sum of product execution unit) 132 is exclusively used for SIMD sum of product arithmetic.

First, in the case of executing SIMD sum of product arithmetic, source data to be supplied to the first sum of product arithmetic circuit 131 is read from a memory 110. At the same time, source data to be supplied to the second sum of product arithmetic circuit 132 is read from the memory 110 from an address having "1" incremented to its source data address. This processing of incrementing "1" is carried out by limiting the address of the source data to be supplied to the first sum of product arithmetic circuit 131 to an even number, and substituting the lowest bit with "1" without actual practice. This realizes high-speed reading.

The source data read from the memory 110 is supplied to the sum of product arithmetic circuits 131 and 132 respectively. Source data 3 (source 3) of the sum of product arithmetic circuits (131, 132) is read from the accumulators (141, 142). In other words, to the first sum of product arithmetic circuit 131, the source data 3 from the first accumulator 141 (ACC1) and the second accumulator 142 (ACC2) can be read via a selector 160 that is controlled based on an address control signal S11 from the SIMD-corresponding address decoder 120. To the second sum of product arithmetic circuit 132, the source data from the second accumulator 142 is read.

A result of the processing of the first sum of product arithmetic circuit 131 is stored in the first accumulator 141. At the same time, the result of the processing of the first sum of product arithmetic circuit 131 is selectively stored in the second accumulator 142 together with a result of the processing of the second sum of product arithmetic circuit 132 via the selector 150 controlled based on the address control signal S12 output from the SIMD-corresponding address decoder 120. The SIMD sum of product arithmetic is executed in the manner as described above.

FIG. 6 is a block diagram showing an SIMD sum of product arithmetic circuit according to one embodiment of the present invention. The SIMD sum of product arithmetic circuit of the present embodiment is structured based on the addition of a slight modification to the above-described conventional SIMD sum of product arithmetic circuit.

In other words, as is clear from the comparison between FIG. 5 and FIG. 6, the SIMD sum of product arithmetic circuit of the present embodiment has the following addition to the conventional SIMD sum of product arithmetic circuit shown in FIG. 5. A data path DP21 and a selector 251 for writing a processing result of the second sum of product arithmetic circuit 232 (132) to the first accumulator 241 (141) are additionally provided. Further, a data path DP22 and a selector 262 for supplying the source data 3 from the first accumulator 241 to the second sum of product arithmetic circuit 232 are additionally provided. The selector 251 is controlled based on an address control signal S23 from an SIMD-corresponding address decoder 220, and the selector 262 is controlled based on an address control signal S24 from the SIMD-corresponding address decoder 120. The memory 110, the first sum of product arithmetic circuit 131, the second accumulator 142, the SIMD-corresponding address decoder 120, and the selectors 150 and 160 in FIG. 5 correspond to the memory 210, the first sum of product arithmetic circuit 231, the second accumulator 242, the SIMD-corresponding address decoder 220, and selectors 252 and 261 in FIG. 6 respectively.

In the present embodiment, at the time of executing a sum of product arithmetic, the SIMD-corresponding address decoder 220 is supplied with a swap instruction signal for generating an address that has been swapped with an address generated at the time of executing an ordinary SIMD sum of product arithmetic. The swap instruction signal is generated by a decoder for decoding an instruction.

As explained above, the sum of product arithmetic circuit of the present embodiment shown in FIG. 6 executes the following processing (arithmetic), based on the above modification to the conventional SIMD sum of product arithmetic circuit shown in FIG. 5.

First, source data (sources 1 and 2) are read from the memory 210. The subsequent process up to the supply of the data to the first and second sum of product arithmetic circuits 231 and 232 is the same as that of the conventional SIMD sum of product arithmetic shown in FIG. 5.

To the first sum of product arithmetic circuit 231, data is read from the second accumulator 242 by the selector 261 that is controlled based on the address control signal S21 from the SIMD-corresponding address decoder 220. To the second sum of product arithmetic circuit 232, data is read from the first accumulator 241 by the selector 262 that is controlled based on the address control signal S24 from the SIMD-corresponding address decoder 220.

A result of the processing of the first sum of product arithmetic circuit 231 is stored in the second accumulator 242 by the selector 252 that is controlled based on the address control signal S22 from the SIMD-corresponding address decoder 220. A result of the processing of the second sum of product arithmetic circuit 232 is stored in the first accumulator 241 by the selector 251 that is controlled based on the address control signal S23 from the SIMD-corresponding address decoder 220.

As explained above, according to the present first embodiment, it is possible to realize an SIMD sum of product arithmetic circuit capable of executing a high-speed sum of product arithmetic without overhead, based on a slight change in the circuits.

Figure 7:
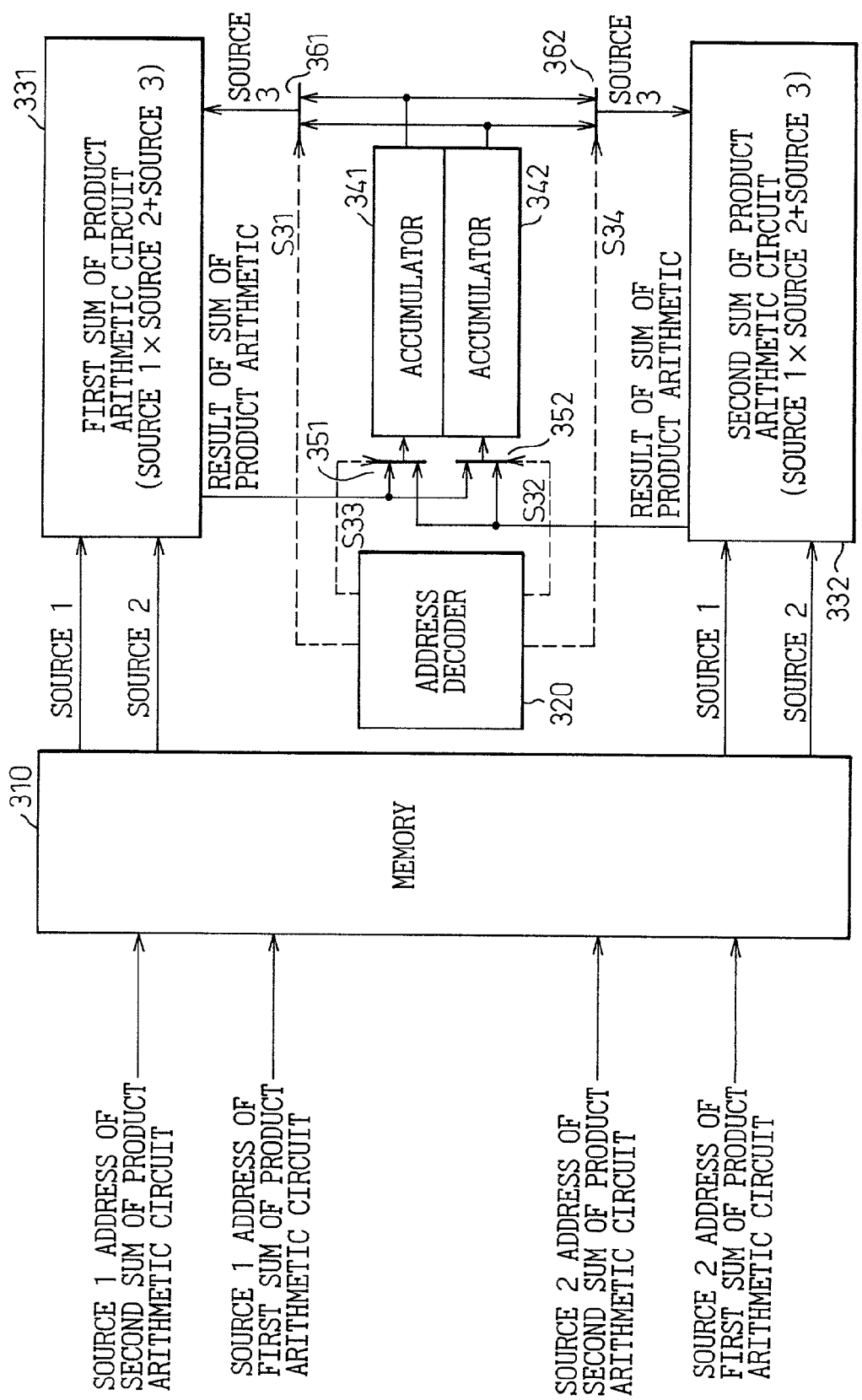
FIG. 7 is a block diagram showing one example of two parallel SISD sum of product arithmetic circuits relating to a relevant technique.

FIG. 7 is a block diagram showing one example of two parallel SISD sum of product arithmetic circuits relating to a relevant technique. This shows a data processing unit having sum of product arithmetic circuits capable of concurrently executing two SISD sum of product arithmetics.

Accumulators 341 and 342 can read source data from both a first sum of product arithmetic circuit 331 and a second sum of product arithmetic circuit 332, and can write results of processing to the sum of product arithmetic circuits 331 and 332. Therefore, the sum of product arithmetic circuits shown in FIG. 7 already have a data path structure of the first embodiment shown in FIG. 6. However, the sum of product arithmetic circuits of this relevant technique shown in FIG. 7 are for carrying out only two parallel SISD sum of product arithmetics, and the execution of SIMD sum of product arithmetic has not been taken into account.

Namely, the sum of product arithmetic circuits shown in FIG. 7 execute the following two parallel SISD sum of product arithmetics.

First, source data to be supplied to the first sum of product arithmetic circuit 331 is read from a memory 310, and, at the same time, source data to be supplied to a second sum of product arithmetic circuit 332 is read from the memory 310. The source data read from the memory 310 are supplied to the sum of product arithmetic circuits 331 and 332 respectively.

Source data 3 (source 3) of the sum of product arithmetic circuits are read from accumulators 341 and 342 respectively. When it is possible to read data from both accumulators 341 and 342 to the first sum of product arithmetic circuit 331, the data to the first sum of product arithmetic circuit 331 is read from the first accumulator 341 based on the address control signal S31 from the address decoder 320. To the second sum of product arithmetic circuit 332, the data is read from the second accumulator 342.

To the first sum of product arithmetic circuit 331, data is read from the accumulator 341 or 342 based on the address control signal S31 output from the address decoder 320. To the second sum of product arithmetic circuit 332, data is read from the accumulator 341 or 342 based on the address control signal S34 output from the address decoder 320.

A result of the processing of the first sum of product arithmetic circuit 331 is stored in the accumulator 341 or 342 based on the address control signal S32 output from the address decoder 320. A result of the processing of the second sum of product arithmetic circuit 332 is stored in the accumulator 341 or 342 based on the address control signal S33 output from the address decoder 320. In this case, the data are not written into the same accumulator at the same time.

Figure 8:
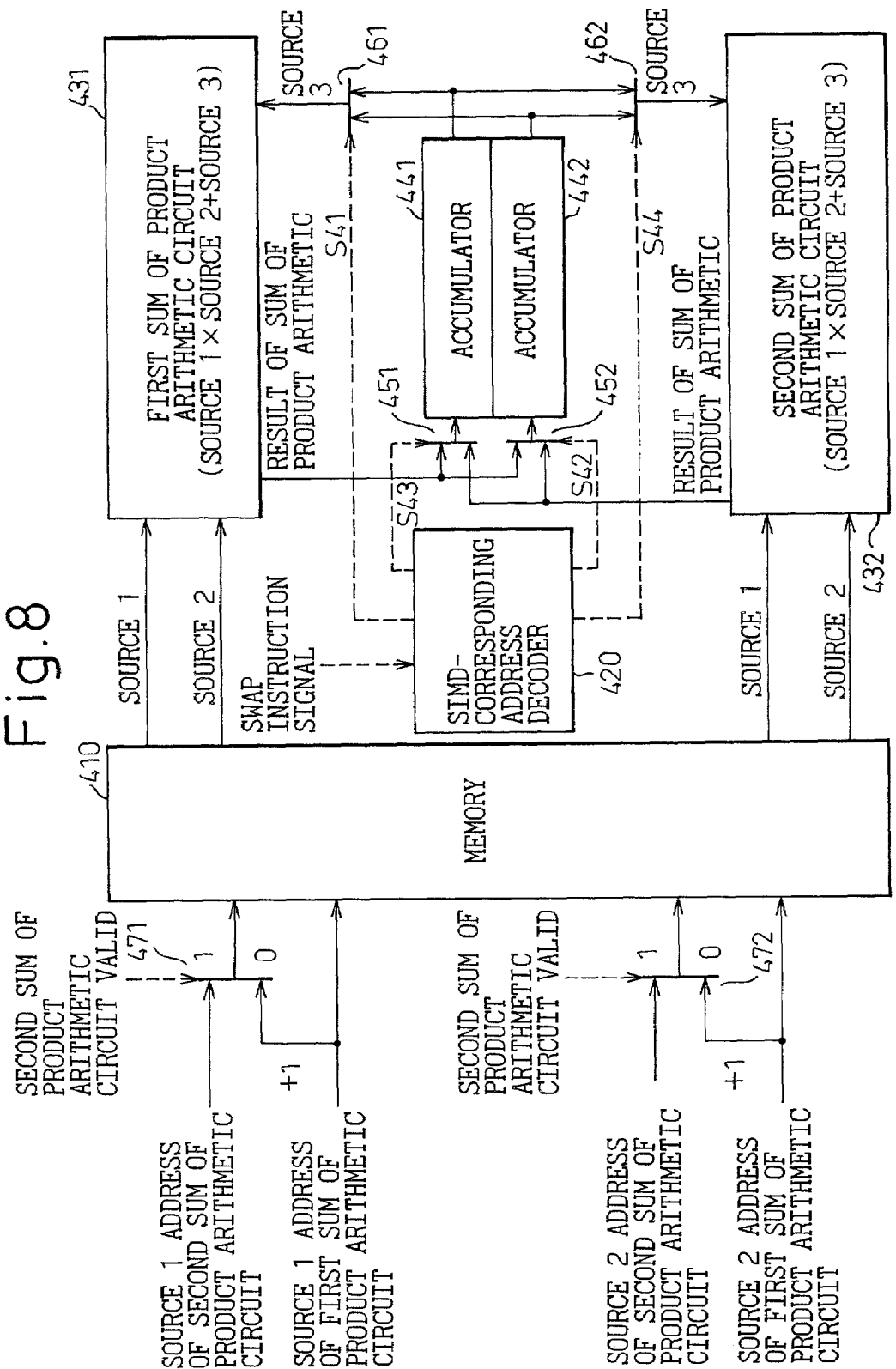
FIG. 8 is a block diagram showing an SIMD sum of product arithmetic circuit according to another embodiment of the present invention.

The parallel SISD sum of product arithmetics are executed in the manner as described above. FIG. 8 shows a case where the two parallel SISD sum of product arithmetics can execute the SIMD sum of product arithmetic circuit of the present invention. FIG. 8 is a block diagram showing an SIMD sum of product arithmetic circuit according to another embodiment of the present invention.

First, at the time of executing the SISD sum of product arithmetic, the addresses of source data (sources 1 and 2) to be supplied to a second sum of product arithmetic circuit 432 are replaced by the addresses of the source data to be supplied to the second sum of product arithmetic circuit 432 at the time of executing the SIMD sum of product arithmetic (that is, the addresses of the source data to be supplied to a first sum of product arithmetic circuit 431, incremented by one) by using selectors 471 and 472. A signal for controlling the selectors 471 and 472 is generated as follows. In this way, it becomes possible to control the selectors at high speed without requiring special decoding.

At the time of executing the SIMD sum of product arithmetic, the execution of the SISD sum of product arithmetic using the second sum of product arithmetic circuit 432 is made invalid. With this arrangement, it is only necessary to structure the selectors 471 and 472 such that these selectors select the addresses of the source data to be supplied to the second sum of product arithmetic circuit 432 at the time of executing the SIMD sum of product arithmetic, when the SISD sum of product arithmetic is not executed. This can be applied to all resources to be supplied to the instruction decoder that generates a control signal for operating the second sum of product arithmetic circuit 432, not only to the addresses. In other words, based on the arrangement of the validity of executing the SISD sum of product arithmetic, it becomes possible to apply all the SISD sum of product arithmetics to the high-speed execution of the SIMD sum of product arithmetic by minimizing effects applied to the SISD sum of product arithmetic circuits.

After the source data (the source 1 and 2) have been supplied to the sum of product arithmetic circuit as described above, an SIMD-corresponding address decoder 420 supplies source data (source 3) stored in accumulators 441 and 442 to the sum of product arithmetic circuits 431 and 432. Results of the sum of product arithmetic are stored in the accumulators 441 and 442 respectively.

Figure 9:
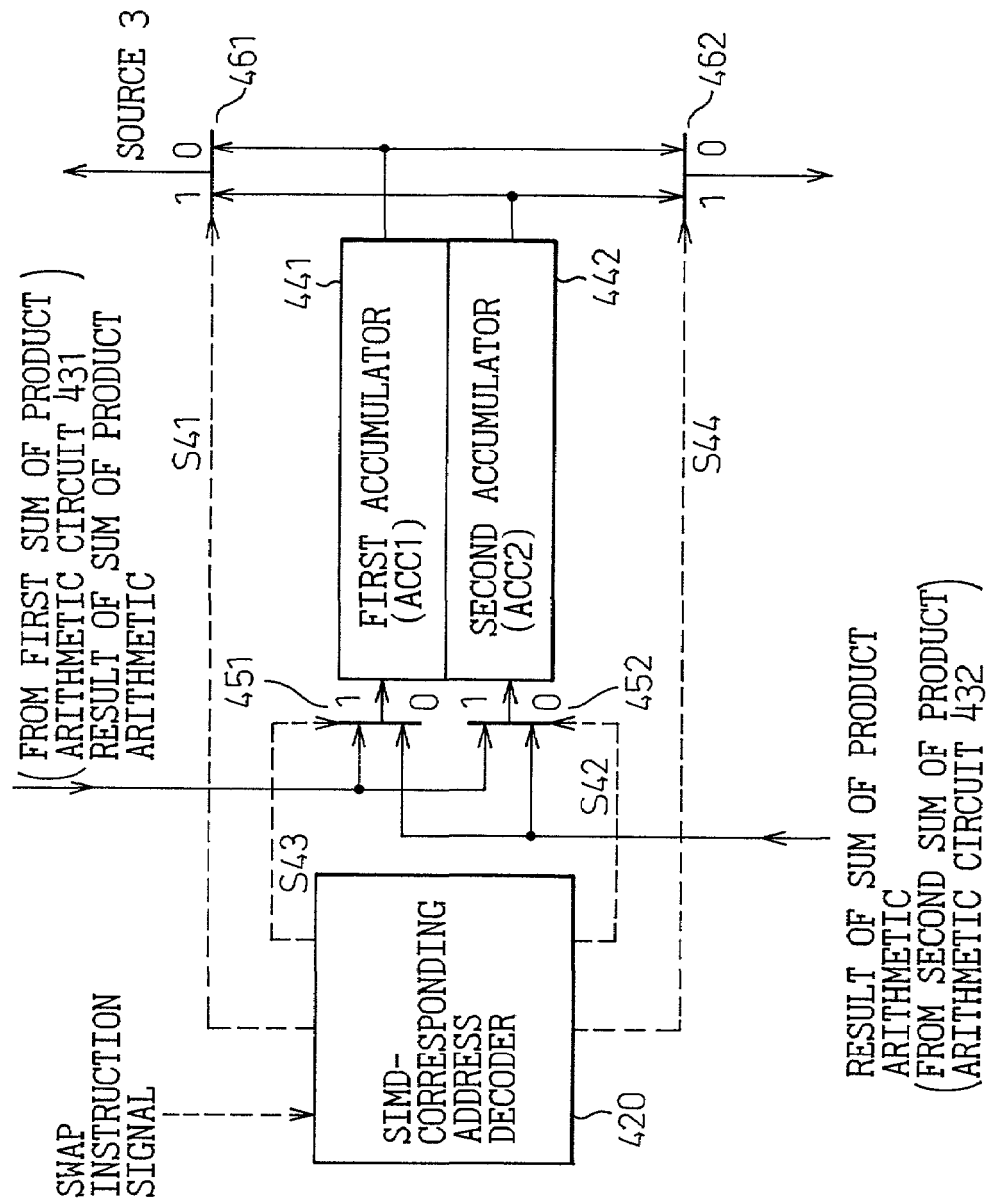
FIG. 9 is a diagram for explaining the operation of the SIMD sum of product arithmetic circuit shown in FIG. 8.

FIG. 9 is a diagram for explaining the operation of the SIMD sum of product arithmetic circuit shown in FIG. 8. The following Table 1 shows a replacement truth table (2=2) of accumulator addresses (ACC addresses).

TABLE 1

ACC address replacement truth table
(Example: 2 × 2)

| | NORMAL | | SWAP | | |
|---|---|---|---|---|---|
| SELECTOR | PATH SELECTED | ACC USED | PATH SELECTED | ACC USED | SUM OF PRODUCT ARITHMETIC CIRCUIT USED |
| 461 (S41) | 0 | ACC2 | 1 | ACC1 | SECOND SUM OF PRODUCT ARITHMETIC CIRCUIT (432) |
| 452 (S42) | 0 | ACC2 | 1 | ACC1 | |
| 451 (S43) | 1 | ACC1 | 0 | ACC2 | FIRST SUM OF PRODUCT ARITHMETIC CIRCUIT (431) |
| 462 (S44) | 1 | ACC1 | 0 | ACC2 | |

In an ordinary SIMD sum of product arithmetic (normal), selectors 451 and 462 select a path "1", and selectors 452 and 461 select a path "0", based on control signals S41 to S44. Further, a first sum of product arithmetic circuit 431 is connected to a first accumulator 441 (ACC1), and a second sum of product arithmetic circuit 432 is connected to a second accumulator 442 (ACC2), based on the control signals S41 to S44.

On the other hand, in an SIMD sum of product arithmetic at the replacement time (swap), the selectors 451 and 462 select a path "0", and the selectors 452 and 461 select a path "1", based on the control signals S41 to S44. Further, the first sum of product arithmetic circuit 431 is connected to the second accumulator 442 (ACC2), and the second sum of product arithmetic circuit 432 is connected to the first accumulator 441 (ACC1), based on the control signals S41 to S44.

As explained above, according to the present embodiment shown in FIG. 8 and FIG. 9, it is possible to realize an SIMD sum of product arithmetic circuit capable of executing a matrix arithmetic without a large change in the existing circuits (the sum of product arithmetic circuits of the relevant technique as shown in FIG. 7), without overhead.

Figure 10:
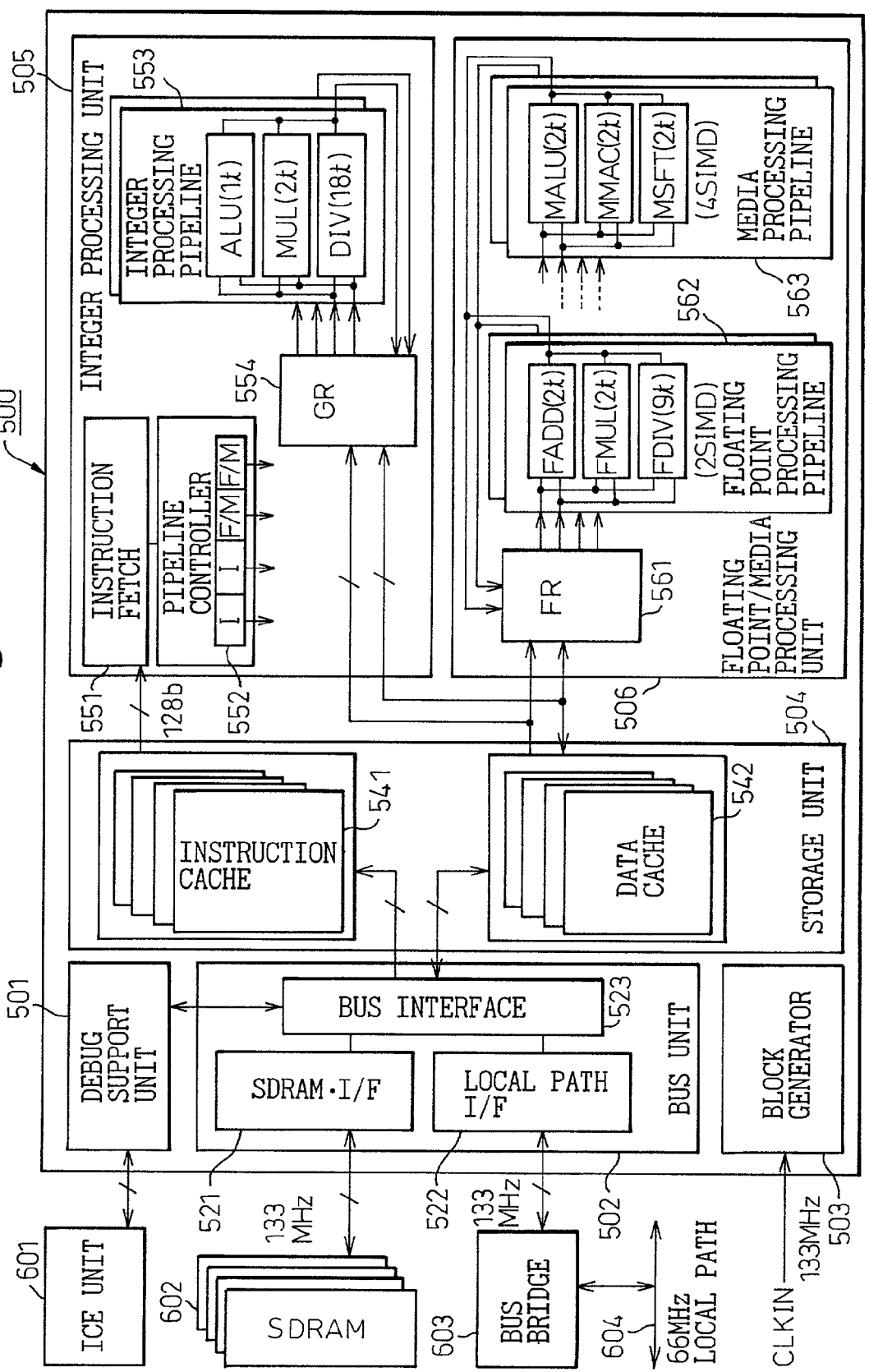
FIG. 10 is a block diagram showing a total structure of a processor to which the SIMD sum of product arithmetic circuit relating to the present invention is applied.

FIG. 10 is a block diagram showing a total structure of a processor to which the SIMD sum of product arithmetic circuit relating to the present invention is applied. FIG. 10 shows one example of a built-in application specialized processor employing the VLIW (Very Long Instruction Word: long instruction word/parallel execution type) architecture. In other words, this shows one example of a semiconductor integrated circuit device having the SIMD sum of product arithmetic circuit relating to the present invention formed on a semiconductor chip.

In FIG. 10, a reference number 601 denotes an ICE (in-circuit emulator) unit, 602 denotes a synchronous DRAM (SDRAM), 603 denotes a bus bridge, 604 denotes a local bus, and 500 denotes a processor (a semiconductor integrated circuit device).

The processor 500 consists of a debug support unit 501, a bus unit 502, a clock generator 503, a storage unit 504, an integer processing unit 505, and a floating-point/media processing unit 506. The bus unit 502 consists of an SDRAM*I/F 521 for interfacing with the SDRAM 602, a local bus I/F 522 for interfacing with the local bus 604 via the bus bridge 603, and a bus interface 523 provided between the storage unit 504, the debug support unit 501, the SDRAM*I/F 521, and the local bus I/F 522. The debug support unit 501 is connected with the ICE unit 601, for supporting the debug unit.

The storage unit 504 has an instruction cache 541, and a data cache 542. The integer processing unit 505 consists of an instruction fetch 551 for temporarily holding an instruction from the instruction cache 541, a pipeline controller 552 for controlling an instruction (for example, a VLIW instruction) from the instruction fetch 551 by dividing this instruction into an integer processing (I) and a floating-point/media processing (F/M), an integer processing pipeline 553, and a general register file (RAM) 554.

The floating-point/media processing unit 506 consists of a floating/register file (RAM) 561, a floating point processing pipeline 562, and a media processing pipeline 563. The floating point processing pipeline 562 has two SIMD sum of product arithmetic circuits, for example, and the media processing pipeline 563 has four SIMD sum of product arithmetic circuits, for example. The above-described SIMD sum of product arithmetic circuits relating to the present invention can be applied to the floating point processing pipeline 562, and the media processing pipeline 563.

The processor (the semiconductor integrated circuit device) 500 to which the SIMD sum of product arithmetic circuits relating to the present invention are applied consists of a plurality of 32-bit integer processing units (505: two units, for example), and floating-point/media processing units (506: two units for each, for example) (six processing units in total, for example). Each integer processing unit 505 carries out a high-performance signal processing, and each media processing unit (floating-point/media processing units 506) processes a large volume of continuous data (media data) like an image.

As described above in detail, according to the present invention, it is possible to provide a sum of product arithmetic circuit and a semiconductor integrated circuit device capable of executing a high-speed SIMD matrix arithmetic without a substantial alteration to the circuit.

Many different embodiments of the present invention may be constructed without departing from the spirit and scope of the present invention, and it should be understood that the present invention is not limited to the specific embodiments described n this specification, except as defined in the appended claims.

What is claimed is:

1. A computer-readable recording medium storing a program controlling a computer to perform a sum of product arithmetic method of enabling a concurrent execution of 2n (where n is a natural number) parallel sum of product arithmetic, wherein:

said sum of product arithmetic is executed using $2^m$ (m=0, ..., $\log_2$ n) accumulators as one set, and by replacing a 2p−1th accumulator with an adjacent 2pth (p=1, ..., n/2) accumulator in accordance with a swap instruction signal, and by replacing said accumulator addresses, without changing sequence of accumulator addresses in said set as accumulator addresses to be allocated to sum of product arithmetic circuits for said sum of product arithmetic; and said sum of product arithmetic is an SIMD sum of product arithmetic.

2. A computer-readable recording medium storing a program controlling a computer to perform a sum of product arithmetic method of enabling an SISD sum of product arithmetic circuit comprising 2n (where n is a natural number) sum of product execution units that are operated concurrently, to execute sum of product arithmetic, wherein:

said sum of product execution units are used for sum of product arithmetic; and said sum of product arithmetic is executed using $2^m$ (m=0, ..., $\log_2$ n) accumulators as one set, and by replacing a 2p−1th accumulator with an adjacent 2pth (p=1, ..., n/2) accumulator in accordance with a swap instruction signal, and by replacing said accumulator addresses, without changing sequence of accumulator addresses in said set as accumulator addresses to be allocated to sum of product execution units for said sum of product arithmetic.

3. A sum of product arithmetic circuit comprising 2n (where n is a natural number) sum of product execution units that are operated concurrently, each sum of product execution unit being equipped with a multiplier, an adder and an accumulator, wherein:

said sum of product arithmetic circuit executes sum of product arithmetic using $2^m$ (m=0, ..., $\log_2$ n) accumulators as one set, and by replacing a 2p−1th accumulator with an adjacent 2pth (p=1, ..., n/2) accumulator in accordance with a swap instruction signal, without changing sequence of accumulator addresses in said set as accumulator addresses to be allocated to sum of product execution units for said sum of product arithmetic; and said sum of product arithmetic circuit further comprises:

first selectors, each provided for each sum of product execution unit, for supplying data of each accumulator by switching data of said accumulator; and second selectors, each provided for each accumulator, for switching a processing result of each sum of product execution unit, and storing said switched processing result, and wherein said sum of product arithmetic circuit controls said first and second selectors to make said sum of product execution units execute a predetermined sum of product arithmetic.

4. The sum of product arithmetic circuit as claimed in claim 3, wherein each of said first and second selectors is switch controlled based on a control signal output from an address decoder to which a swap instruction signal is supplied.

5. The sum of product arithmetic circuit as claimed in claim 3, further comprising:

third selectors, for switching source data addresses between addresses for an SISD sum of product arithmetic and addresses for said sum of product arithmetic, and for inputting said source data addresses to a memory from which source data is to be supplied to said 2n sum of product execution units.

6. The sum of product arithmetic circuit as claimed in claim 5, wherein each of said first, second and third selectors is switch controlled based on a valid signal for selecting one sum of product execution unit as a valid unit.

7. The sum of product arithmetic circuit as claimed in claim 3, further comprising:

fourth selectors, for switching resources to be supplied to an instruction decoder for generating a control signal necessary for controlling said 2n sum of product execution units, between resources for an SISD sum of product arithmetic and resources for said sum of product arithmetic, and using said selected resources.

8. The sum of product arithmetic circuit as claimed in claim 3, wherein said sum of product arithmetic is an SIMD sum of product arithmetic.

9. A semiconductor integrated circuit device having a semiconductor chip on which a sum of product arithmetic circuit is formed, said sum of product arithmetic circuit comprising 2n (where n is a natural number) sum of product execution units that are operated concurrently, each sum of product execution unit being equipped with a multiplier, an adder and an accumulator, wherein:

said sum of product arithmetic circuit executes sum of product arithmetic using $2^m$ (m=0, ..., $\log_2$ n) accumulators as one set, and by replacing a 2p−1th accumulator with an adjacent 2pth (p=1, ..., n/2) accumulator in accordance with a swap instruction signal, without changing sequence of accumulator addresses in said set as accumulator addresses to be allocated to sum of product execution units for said sum of product arithmetic; and said sum of product arithmetic circuit further comprises:

first selectors, each provided for each sum of product execution unit, for supplying data of each accumulator by switching data of said accumulator; and second selectors, each provided for each accumulator, for switching a processing result of each sum of product execution unit, and storing said switched processing result, and wherein said sum of product arithmetic circuit controls said first and second selectors to make said sum of product execution units execute a predetermined sum of product arithmetic.

10. The semiconductor integrated circuit device as claimed in claim 9, wherein each of said first and second selectors is switch controlled based on a control signal output from an address decoder to which a swap instruction signal is supplied.

11. The semiconductor integrated circuit device as claimed in claim 9, wherein said sum of product arithmetic circuit further comprises:

third selectors, for switching source data addresses between addresses for an SISD sum of product arithmetic and addresses for said sum of product arithmetic, and for inputting said source data addresses to a memory from which source data is to be supplied to said 2n sum of product execution units.

12. The semiconductor integrated circuit device as claimed in claim 11, wherein each of said first, second and third selectors is switch controlled based on a valid signal for selecting one sum of product execution unit as a valid unit.

13. The semiconductor integrated circuit device as claimed in claim 9, wherein said sum of product arithmetic circuit further comprises:
fourth selectors, for switching resources to be supplied to an instruction decoder for generating a control signal necessary for controlling said 2n sum of product execution units, between resources for an SISD sum of product arithmetic and resources for said sum of product arithmetic, and using said selected resources.

14. The semiconductor integrated circuit device as claimed in claim 9, wherein said sum of product arithmetic is an SIMD sum of product arithmetic.

15. A sum of product arithmetic method of enabling a concurrent execution of 2n (where n is a natural number) parallel sum of product arithmetic, wherein:
said sum of product arithmetic is executed using $2^m$ ($m=0, \ldots, \log_2 n$) accumulators as one set, by replacing a 2p−1th accumulator with an adjacent 2pth ($p=1, \ldots, n/2$) accumulator in accordance with a swap instruction signal, and by replacing said accumulator addresses, without changing sequence of accumulator addresses in said set as accumulator addresses to be allocated to sum of product arithmetic circuits for said sum of product arithmetic; and
said sum of product arithmetic is an SIMD sum of product arithmetic.

16. A sum of product arithmetic method of enabling an SISD sum of product arithmetic circuit comprising 2n (where n is a natural number) sum of product execution units that are operated concurrently, to execute sum of product arithmetic, wherein:
said sum of product execution units are used for sum of product arithmetic; and
said sum of product arithmetic is executed using $2^m$ ($m=0, \ldots, \log_2 n$) accumulators as one set, by replacing a 2p−1th accumulator with an adjacent 2pth ($p=1, \ldots, n/2$) accumulator in accordance with a swap instruction signal, and by replacing said accumulator addresses, without changing sequence of accumulator addresses in said set as accumulator addresses to be allocated to sum of product execution units for said sum of product arithmetic.

* * * * *